UNITED STATES PATENT OFFICE.

ALVIN A. SCHMIDT, OF CHICAGO, ILLINOIS.

COMPOSITION FOR MAKING RESILIENT MOLDS.

1,132,217. Specification of Letters Patent. Patented Mar. 16, 1915.

No Drawing. Application filed September 2, 1909. Serial No. 515,899.

*To all whom it may concern:*

Be it known that I, ALVIN A. SCHMIDT, a citizen of the United States, residing at Chicago, in the county of Cook and State of Illinois, have invented an Improved Composition for Making Resilient Molds, of which the following is a specification.

My process relates to an improved composition for making resilient molds especially adapted for use in making molds for concrete or Portland cement castings and has for its object the production of a composition for making resilient molds which will produce clear and sharp castings and which may be used over and over again if desired.

My invention consists in the composition hereinafter described and claimed.

The composition consists of 20 pounds of glycerin, 10 pounds of Venice turpentine, 100 pounds of gelatin or fish glue, and 10 pounds of water. In preparing this composition the gelatin or fish glue is boiled in 10 pounds of water in a water bath and the glycerin and turpentine added to it while boiling. This mixture while hot has a consistency about like molasses and when chilled is a solid flexible mass. It should be poured into the form or casing for making the mold while still hot and then allowed to cool and set.

The form or casing for making the mold may be made in any desired or usual manner but I recommend that it be made as follows: Plastic clay is first applied to the outer surface of the subject or pattern to be cast as uniformly as practicable and substantially one inch thick and a plaster of Paris casing applied over this. The casing may, if desired, be made in sections. After the plaster of Paris casing has set, the casing with the clay adhering to it is removed from the subject and the clay removed from the plaster casing. The inner surface of this casing is then given a coat of shellac and after this has set, a coat of oil. Then the plaster casing is replaced around the subject or pattern inclosing a space of about one inch around. The mold composition is then poured into this space while hot and allowed to set. Then the casing and composition mold are removed from the subject and the mold removed from the casing which may be readily done owing to the shellac and oil on the latter's inner surface.

The mold thus produced may have its interior surface further treated with dust or other preparations to facilitate separation from a casting and will be found to produce clear and sharp castings. If desired, the material in the mold may be used over and over again.

While I have described in detail the preferred proportions of ingredients, these may be varied somewhat while still coming within the scope of the appended claim.

Having described my invention what I claim as new and desire to secure by Letters Patent is:

A mold composition consisting of the following ingredients mixed together in substantially the following proportions: 20 pounds of glycerin; 10 pounds of Venice turpentine; 100 pounds of gelatinous matter, and 10 pounds of water.

In testimony whereof I have signed my name to this specification in the presence of two subscribing witnesses.

ALVIN A. SCHMIDT.

Witnesses:
 HELEN F. LILLIS,
 JOSHUA R. H. POTTS.